United States Patent Office 3,438,953
Patented Apr. 15, 1969

3,438,953
CARBOXY AND ESTER TERMINATED CO-
POLYMERS OF VINYLIDENE FLUORIDE-
HEXAFLUOROPROPENE AND METHOD
OF PREPARATION
David E. Rice, Minneapolis, and Carl L. Sandberg, St.
Paul, Minn., assignors to Minnesota Mining and Manu-
facturing Company, St. Paul, Minn., a corporation of
Delaware
No Drawing. Filed Jan. 18, 1965, Ser. No. 426,354
Int. Cl. C08f 15/06, 27/08
U.S. Cl. 260—87.7                                26 Claims

ABSTRACT OF THE DISCLOSURE

Carboxyl and carboxyl ester terminated copolymers of vinylidene fluoride and perfluoropropene are provided as well as a process for making such copolymers by, inter alia, reacting a liquid mixture of vinylidene fluoride and perfluoropropene with a bis-(omega carboxyl ester perfluoroacyl) peroxide.

This invention relates to new and very useful copolymers of vinylidene fluoride and perfluoropropene, to compositions using such copolymers, and to methods for making the same.

In one aspect, this invention relates to a process for the preparation of carboxyl or carboxyl ester terminated copolymers of vinylidene fluoride and perfluoropropene which are characterized by the formula:

(1)
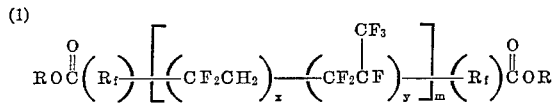

where
$R_f$ is a perfluoroalkylene group containing from 1 through 15 carbon atoms,
R is hydrogen; or an organic radical such as an $\alpha, \alpha$-dihydroalkyl radical containing not more than 20 carbon atoms and not more than 14 hydrogen atoms, the only other substituents in said alkyl radical being fluorine, or an aryl radical containing from 6 through 12 carbon atoms, and which may be substituted with fluorine,
$m$ is a positive whole number of at least 5 and preferably less than 500 and more preferably less than 100,
$x$ and $y$ are positive numbers, $y$ being 1, and the average ratio of $x$ to $y$ in a copolymer molecule is from about 1:1 to 10:1.

In another aspect this invention is directed to copolymers made by the afore-indicated process which are characterized by the formula (2)
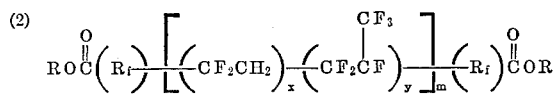

where R, $m$, $x$ and $y$ have their above-indicated definitions. Preferably $R_f$ is defined by the expression $(CF_2)_n$ where $n$ is a positive whole number of from 2 to 10. Also preferably the ratio of $x$ to $y$ is from about 1:1 to 1.9:1. These preferred copolymers have superior thermal oxidative stability especially when cured, as is more particularly hereinafter described.

In another aspect, this invention is directed to cured copolymers of Formula 2 above, especially those preferred products obtained by curing the polymer where $n$ is 2 to 10 with a polyhydroxy compound.

In another aspect, this invention is directed to sealant compositions using at least one copolymer of Formula 1 above.

Heretofore, so far as is known to us, there were no processes available for attaching carboxy functional terminal groups to copolymers of vinylidene fluoride and perfluoropropene in such a way that the carboxyl groups are spaced from the copolymer chain by a perfluoroalkylene moiety. By the present invention a method is provided for producing copolymers so terminated.

Also, heretofore, so far as is known to us, there were no elastomeric materials available which possessed the combination of fuel resistance, thermal oxidative stability, processability, and final physical properties which could fulfill the sealant requirements suitable for the manufacture of sealants useful in sealing the fuel tanks of aircraft capable of flying at super-sonic speeds and which therefore encounter temperatures in the range of 550° F. or greater. There has now been discovered a class of fluorocarbon polymers which is more particularly defined by Formula 2 above, where $n$ is 2 to 10, the members of which surprisingly and unexpectedly possess an improved combination of sealant properties when formulated into appropriate compositions.

It is an object of the present invention to provide new and useful polymers and sealant compositions using such polymers.

An object of this invention is to provide a process for making copolymers of vinylidene fluoride and perfluoropropene which are terminated by perfluoroalkyl acids or the corresponding esters.

Another object of this invention is to provide a new class of carboxyl or carboxyl ester terminated copolymers of vinylidene fluoride and perfluoropropene.

Another object of this invention is to provide a class of fluorocarbon copolymers which resist degradation under the influence of thermal-oxidative environments of the type associated with aircraft flying at super-sonic speeds.

Another object of this invention is to provide sealant compositions useful in sealing the fuel tanks of aircraft flying at super-sonic speeds and which are therefore subject to thermal-oxidative environments.

Various other objects and advantages of the present invention will become apparent to those skilled in the art from the accompanying description and disclosure.

By the present invention copolymers of vinylidene fluoride and perfluoropropene are prepared by contacting a liquid mixture of these two monomers with bis-($\omega$-carboxyl ester perfluoroacyl) peroxides. In one embodiment, vinylidene fluoride and perfluoropropene in the proportions required to obtain the ratio of $x$ to $y$ outlined above in Formula 1 are contacted with an aqueous solution of a peroxide selected from the group consisting of alkali metal and alkaline earth metal peroxides, and a perfluoro acyl halide. In this embodiment the peroxide is generated in situ. The reaction is illustrated by the following equations:

(3)
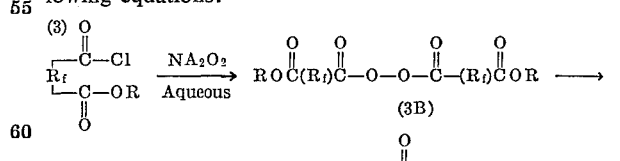

(4)
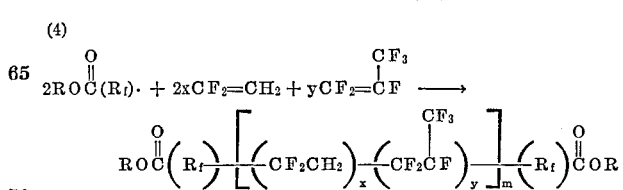

In Equations 3 and 4 above $R_f$, R, $m$, $x$ and $y$ are as defined above in reference to Formula 1. Preferably, in this process as described in Equations 3 and 4, R is an organic radical such as is more specifically described in connection with the definitions of Formula 1 above. Since Compound 3B above must be soluble in the fluorocarbon monomer liquid phase of the polymerization mixture, it is required that R be such a group as will render Compaund 3B soluble in the polymerization liquid mixture. Preferably, therefore, R has the indicated definitions as defined above.

Alternatively, the bis-(ω-carboxyl ester perfluoroacyl) peroxides (the structure of Formula 3B above) can be first prepared in fluorocarbon solution, and then this solution can be used directly in the polymerization reaction described in Equation 4 above.

The polymerization reaction described in Equation 4 is carried out under liquid phase conditions preferably at autogenous pressures. A preferred operating temperature is in the range of 20 to 40° C. although those skilled in the art will appreciate that temperatures in the range from about 0 to 100° C. or even higher or lower can be employed dependent upon the particular processing conditions, apparatus etc., employed in any given circumstance.

A convenient procedure for practicing the process of making compounds of Formula 1 involves initially dissolving a monoester of a perfluoro dicarboxylic acid chloride of the formula (2A) 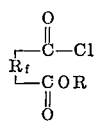

wherein $R_f$ and R are as defined above in a liquid mixture of vinylidene fluoride and perfluoropropene. The mole ratio of perfluoropropene to vinylidene fluoride in such liquid mixture is preferably at least 2:1. The mole ratio of vinylidene fluoride to said mono ester acid chloride ranges from 25:1 to 1:1. Next and secondly the resulting liquid mixture is mixed with an aqueous solution of alkali metal or alkaline earth metal peroxide, the amount of such peroxide in the aqueous solution being at least stoichiometrically equivalent to the amount of said mono ester acid chloride. The ratio of the volume of the resulting liquid mixture to that of the aqueous solution ranges from 1:10 to 10:1. As a result there is generated in situ a free radical initiator having the formula (2B) 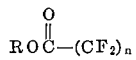

where R and $n$ have the same meaning ascribed to them as in the case of Formula 2A. Generation of this free radical initiator is promoted by maintaining intimate contact between the respective two phases as by vigorous agitation and by maintaining the entire reaction mixture under autogenous pressures using temperatures in the range of from about −5 to 100° C. until the desired copolymerization reaction has proceeded to the desired extent.

Another process for polymerizing involves separately forming the peroxide, as by initially intimately contacting as by vigorous agitation a liquid fluorocarbon containing dissolved therein a mono ester of perfluoro dicarboxylic acid chloride of Formula 2A above with an aqueous solution of an alkali metal or alkaline earth metal peroxide. This contacting is conducted at a temperature below 10° C. for a period of time sufficient to generate a diacyl peroxide in the liquid fluorocarbon phase but insufficient to cause appreciable decomposition of such peroxide. The mole ratio of the alkali metal or alkaline earth metal peroxide (in the aqueous solution) to the Formula 2A compound (in the liquid fluorocarbon) is at least stoichiometric. Next, the resulting liquid fluorocarbon phase is separated from the residual aqueous phase. Finally, the resulting fluorocarbon phase is admixed with a liquid mixture of vinylidene fluoride and perfluoropropene such that in said liquid mixture the mole ratio of said vinylidene fluoride to said diacyl peroxide ranges from about 50:1 to 2:1, the mole ratio of said perfluoropropene to said vinylidene fluoride in said liquid mixture being preferably at least 2:1, while maintaining the entire reaction mixture preferably under autogenous pressures and keeping temperatures in the range of from about −5 to 100° C. until the resulting copolymerization reaction has proceeded to the desired extent.

The omega carboxyl ester substituted perfluoroacyl halide used as the starting material in Equation 3 above can be prepared by any convenient route, for example, from the corresponding perfluorinated diacid chloride by the following reaction:

(5) 

where $R_f$ and R have their above-defined meanings.

The diacid chloride is reacted with one equivalent weight of the ROH compound. Liquid phase conditions are employed. A non-reactive solvent may be employed. The temperature of reaction will vary greatly depending upon the particular type of alcohol employed. Commonly the temperature will range from −15 to 100° C. though temperatures below or higher than this can be employed conveniently depending upon the reactants and reaction conditions to be employed. The product is separated from unreacted diacid chloride and diester by distillation. Commonly yields are approximately 50 percent based on the diacid chloride charged.

The 1,1-dihydroperfluoroalkyl esters are prepared by using as the ROH compound in Equations 4 and 5 a 1,1-dihydroperfluoroalkanol prepared by the methods described in U.S. patent No. 2,666,797 or in the Journal of the American Chemical Society, 72, 5071 (1950).

When it is desired to prepare the carboxylic acid terminated copolymer (that is, the copolymer of Formula 1 where R is hydrogen) it is convenient to simply hydrolyze the ester terminated products of Equation 4 as in warm water. For hydrolysis purposes it is preferred to employ copolymers where R is a 1,1-dihydroperfluoroalkyl radical because such substituents are more readily hydrolyzed than are the corresponding hydrocarbon alkyl esters. Other types of termination can be obtained from the carboxyl or carboxyl ester terminated copolymers by suitable reactions.

To prepare the carboxyl or carboxyl ester terminated copolymers of Formula 1 using the copolymerization reaction in Equation 4 above it, it is important to control the ratio of vinylidene fluoride to perfluoropropene so as to obtain copolymers possessing the desired ratio of $x$ to $y$ indicated in Formula 1 above. To prepare the copolymers of Formula 2 above it is important to use alkylene groups as defined in Formula 2 above where $n$ ranges from 2 to 10.

Examples of alkali metal and alkaline earth metal peroxides which may be used in Equation 3 above include sodium peroxide, potassium peroxide and barium peroxide.

In general, polymers of Formula 2 characteristically display greater solubility in fluorocarbon solvents than they do in hydrocarbon solvents. In addition, the polymers of this invention characteristically display fluidity in the uncured state.

As indicated above, the copolymers of this invention are useful in high performance sealant compositions.

When used in sealant compositions, the copolymers of Formula 2 are generally cured or chain extended. Examples of curing or chain extending agents include polyhydric compounds such as pentaerythritol, trimethylolpropane, neopentyl glycol, phloroglucinol, pyrogallol, resorcinol and the like. Such polyhydric substances when cured with compounds of Formula 2 lead to the formation of stable polyester chain extended structures. The cured copolymers of Formula 2, particularly when cured with pentaerythritol, possess good resistance to heat, characteristically displaying a weight loss of less than about 10% on exposure to air at atmospheric pressure at 550° F. for 100 hours. They are therefore useful as sealants for applications where extremely high temperatures are encountered, as in the fuel tanks of supersonic aircraft and missiles.

Other substances which can be used in chain extending include bis-(o-aminophenols) such as 3,3'-dihydroxy benzidine (which when reacted with Formula 1 type compounds lead to the formulation of bis-(benzoxazole) chain extended materials) and 3,3'-dimercaptobenzidine (which when reacted with Formula 1 compounds yields bis-benzothiazole chain extended materials). Typically when curing a Formula 1 copolymer with a polyhydric compound one can employ about one-half mole of such polymer for each hydroxyl group in such polyhydric compound.

Instead of using polyhydric substances as curing or chain extending agents one can use for example:

(1) Organic compounds containing two or more epoxy groups such as dicyclopentadiene diepoxide, vinyl cyclohexene diepoxide, glycidyl ethers of polyhydric aromatic compounds and the like.

(2) Organic compounds containing two or more groups of the formula:

(5) 

where R and R' are each hydrogen or lower alkyl. A specific example is (6) 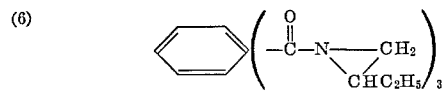

(3) Oxides, hydroxides or salts of di- or tri-valent metals, such as MgO, Ba(OH)$_2$, Cr(O$_2$CCF$_3$)$_3$ and the like.

The completion of curing can be readily determined by the change in the physical and chemical properties of the original mixture compared with the cured mixture; thus, the final product is an elastomeric mass and portions thereof are no longer soluble in solvents for the original copolymer.

When curing a composition of the invention, any convenient procedure can be used. One convenient procedure is to mix a compound of Formula 1 with approximately stoichiometric quantities of a curing agent such as pentaerythritol as by milling on a rubber mill to achieve uniform admixture of the materials together. Instead of using a rubber mill an alternative blending procedure is to mix the separate components together at an elevated temperature in the range of 50° to 100° C.

After homogeneous admixture is obtained of copolymer and curing agent, the mixture is cured by any convenient procedure involving heating the mixture to a temperature typically in the range of from about 200 to 350° F. though lower temperatures can be employed if slower curing rates are to be used.

As those skilled in the art will appreciate, a sealant composition in general may have four or five components, such as a base polymer, a curing agent, a filler, a solvent, and sometimes additionally, resins to promote adhesion.

It is desirable to use as a base polymer one having sufficient fluidity so as not to require a solvent, as a solvent greatly complicates application of the sealant. The polymers of this invention do not require a solvent for use in sealant compositions.

Fillers are typically in the form of finely divided inert powders and used to reduce the cost of the sealant, improve mechanical properties, and control viscosity, but usually are not essential to a sealant composition. Typical filler concentrations range from about 5 to 100 parts per 100 parts of cured copolymer. Common fillers are carbon black, silica, titanium dioxide, various clays, calcium carbonate, zirconium silicate, and the like.

For some highly specialized applications, non-cured sealant compositions are used, but in most applications sealant compositions require curing.

In general, to use an above described sealant composition one conventionally injects same into channels and voids as those familiar with caulking and similar operations will readily appreciate.

The following examples are offered as a better understanding of the present invention.

EXAMPLE 1

Perfluoroglutaric anhydride (56.6 grams) is charged into a flask fitted with a reflux condenser, addition funnel, and stirrer, and then the so charged flask is cooled to −30° C. Anhydrous methanol (10.2 cubic centimeters) is then added dropwise at a rate such that the reaction temperature does not exceed −20° C. Distillation of the reaction mixture gives 57.5 grams CH$_3$O$_2$C(CF$_2$)$_3$COOH, boiling point 88–94° C. at 1 mm. Hg identified by its infrared spectrum and neutralization equivalent. This material is then added dropwise to PCl$_5$ (47.5 grams) and the mixture stirred for one hour at room temperature. Distillation yields 47.4 grams CH$_3$O$_2$C(CF$_2$)$_3$COCl, boiling point 42–44° C. at 15 mm. Hg $n_D^{26}$ (refractive index) 1.3515, identified by its infrared and nuclear magnetic resonance spectra, and neutralization equivalent.

EXAMPLE 2

A 500 cubic centimeter flask fitted with a condenser, stirrer, addition funnel and thermometer is charged with 138.5 grams (0.50 mole) of perfluoroglutaryl chloride and then the so-charged flask is cooled to −15° C. To this is added dropwise 16 grams (0.50 mole) of methyl alcohol while keeping the reaction mixture at −10 to −15° C. After the addition is complete the reaction mixture is stirred for another 30 minutes and then distilled. A yield of 57.5 grams of

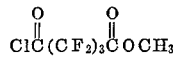

which has a boiling point of 64–68° C. at a pressure of 34 mm. Hg and having a $n_D^{20}$ (refractive index) of 1.3519 is obtained and is further identified by its infrared spectrum and neutralization equivalent. In addition there is obtained 41.8 grams of unreacted perfluoroglutaryl chloride and 34.1 grams of dimethyl perfluoroglutarate.

EXAMPLE 3

Perfluoroglutaryl chloride (50 grams) is heated to 50° C. and water (3.25 grams) is added slowly with stirring. Rapid distillation of the mixture at reduced pressure yields about 10 grams of HOOC(CF$_2$)$_3$COCl. This product has a boiling point of 50–51° C. at 1.5 mm. Hg pressure. The product is identified by its infrared spectrum and by its neutralization equivalent of 86.9 (theoretical neutralization equivalent is 86.2).

EXAMPLE 4

A 250 cubic centimeter 3-neck flask, fitted with a stirrer, thermometer and addition tube is charged with a solvent comprising a mixture of perfluorinated cyclic ethers each molecule of which contains eight carbon atoms (available from the 3M Company under the designation FC—75) (100 cubic centimeters) and the contents cooled to −4° C. A solution consisting of water (10 cubic centimeters), sodium hydroxide (1.2 grams) and 30% hydrogen peroxide (4.5 cubic centimeters) is then added and the temperature again adjusted to −4° C. With vigorous stirring, CH$_3$O$_2$C(CF$_2$)$_3$COCl (4.7 grams) is added all at once resulting in a rapid temperature rise to 6° C. After two minutes reaction time, the mixture is allowed to stratify and 90 cubic centimeters of the fluorocarbon layer withdrawn and cooled to −78° C. The concentration of (CH$_3$—OOC(CF$_2$)$_3$COO)$_2$ in this solution is found to be 4.4×10$^{-5}$ moles/cubic centimeter by titration according to the method of Silbert and Swern (Analytical Chemistry, 30, 385 (1958)).

A 60 cubic centimeter Pyrex ampoule is charged with 30 cubic centimeters of the above peroxide solution, 35 grams perfluoropropene and 1.4 grams vinylidene fluoride. After sealing, the ampoule is warmed to 20° C., shaken briefly in order to obtain a homogeneous solution and then allowed to stand at room temperature for 16 hours. After venting the unreacted perfluoropropene, the polymer is dried under vacuum at 70° C. The product is a sticky gum (5.9 grams) which has an inherent viscosity of 0.070. The presence of fluorocarbon acid ester groups can be detected by infrared and nuclear magnetic resonance analysis.

EXAMPLE 5

A 60 cubic centimeter Pyrexampoule is cooled to −78° C. and charged with a solution consisting of 10 cubic centimeters $H_2O$, 0.60 gram sodium hydroxide and 2 cubic centimeters 30 percent hydrogen peroxide. The ampoule is then cooled in liquid nitrogen and 4.2 grams $CH_3O_2C(CF_2)_3COCl$, 52.5 grams $C_3F_6$ and 2.1 grams $CF_2\!=\!CH_2$ added. The ampoule is then sealed and shaken at room temperature for 16 hours. At the end of this time, the excess perfluoropropene is allowed to distill off and the product dried under vacuum. The combined products from three such runs are dissolved in xylene hexafluoride and the solution washed with water. Evaporation of the solvent yields 27 grams of a viscous liquid polymer which has the following properties: inherent viscosity ($<\eta>$) is 0.047; $M_n$ (number average molecular weight) is 2,800, the mole ratio of $CF_2\!=\!CH_2/C_3F_6$ is about 55/45.

EXAMPLE 6

$ClOC(CF_2)_3COCl$ (75 grams) and phenol (25.5 grams) are refluxed together for 4 hours and the mixture distilled at reduced pressure to give $ClOC(CF_2)_3COOC_6H_5$ boiling point 58–64° C. at 0.3 mm. Hg pressure, neutralization equivalent is 108 (theoretical neutralization equivalent is 111).

A 60 cubic centimeter ampoule is charged with 3.8 grams of this acid chloride, 7.5 cubic centimeters $H_2O$, 0.48 grams NaOH, 1.5 cubic centimeters 30 percent $H_2O_2$, 2.1 grams $CF_2\!=\!CH_2$ and 52.5 grams $C_3F_6$ and shaken at room temperature for 6 hours. A polymeric oil is obtained. The presence of $C_6H_5O_2CCF_2$—groups in the polymer can be detected by infrared analysis.

EXAMPLE 7

A 60 cubic centimeter ampoule is charged with 5 cubic centimeters $H_2O$, 0.05 gram NaOH, and 0.25 cubic centimeter of 30 percent $H_2O_2$. The ampoule is then cooled to liquid nitrogen temperature and 0.22 gram $CH_3O_2C(CF_2)_3COCl$ 2.1 grams $CF_2\!=\!CH_2$ and 52.5 grams $C_3F_6$ added. The ampoule is then shaken at room temperature for 6 hours, opened and the polymer washed with water and methanol, and dried under vacuum. The product (8.0 grams) is a soft rubbery solid containing 45–50 mole percent $C_3F_6$ and having an inherent viscosity at 1 percent concentration in xylene hexafluoride of 0.28, corresponding to a relatively high molecular weight of about 40,000.

EXAMPLE 8

Perfluorosuccinic anhydride (25 grams) is cooled to −10° C. and 4.7 grams anhydrous methanol added slowly, with stirring, maintaining a temperature below 0° C. The mixture is stirred for an hour after the methanol addition is complete and then 40 grams of thionyl chloride is added and the mixture refluxed for 6 hours. Distillation yields approximately 15 grams $CH_3OOC(CF_2)_2COCl$ boiling point 109–113° C .

A 60 cubic centimeter ampoule is charged with 0.48 gram NaOH, 7.5 cubic centimeters $H_2O$ and 1.5 cubic centimeters 30 percent $H_2O_2$. The ampoule is then cooled in liquid nitrogen and 2.5 grams $CH_3OOC(CF_2)_2COCl$, 2.1 grams $CF_2\!=\!CH_2$ and 52.5 grams $C_3F_6$ added. After sealing, the ampoule is shaken at room temperature for six hours, opened and the polymer washed with water and methanol and dried under vacuum. The product (8 grams) is a viscous liquid having an inherent viscosity of 0.06.

EXAMPLE 9

Perfluorosebacic acid (30 grams) is mixed with phosphorous pentachloride (25.3 grams) and the mixture kept at 100° C. with stirring for 3 hours. Phosphorous oxychloride is removed from this mixture by vacuum distillation (50° C. at .1 millimeter Hg) leaving crude perfluorosebacyl chloride. Trifluoroethanol (9.2 grams) is then added and the mixture heated at 100° C. for 16 hours giving a product consisting of essentially equimolar amounts of $CF_3CH_2O_2C(CF_2)_8COCl$ and $CF_3CH_2O_2C(CF_2)_8CO_2CH_2CF_3$ with small amounts of unreacted $ClOC(CF_2)_8COCl$.

A 60 cubic centimeter ampoule is cooled to −80° C. and charged with 13.5 grams of the above reaction mixture, 0.48 gram NaOH, 7.5 cubic centimeters $H_2O$ and 1.5 cubic centimeters 30 percent $H_2O_2$. The ampoule is then cooled in liquid nitrogen and 2.1 grams $CF_2\!=\!CH_2$ and 52.5 grams $C_3F_6$ condensed in. The ampoule is sealed and shaken at room temperature for 6 hours, opened and the polymer (9.2 grams) washed with acetonitrile. The product has an inherent viscosity of 0.08. The presence of $CF_3CH_2O_2CCF_2$—groups in the polymer can be detected by infrared analysis.

EXAMPLE 10

Perfluoroglutaryl chloride (554 grams) and trifluoroethanol (200 grams) are charged into a flask fitted with a reflux condenser and thermometer and heated to reflux. Refluxing is continued for 16 hours. Distillation of the reaction mixture gives 312 grams of $$CF_3CH_2O\overset{O}{\underset{\|}{C}}(CF_2)_3\overset{O}{\underset{\|}{C}}Cl$$

boiling point 75–79° C. at 50 mm. Hg, $n_D^{26}$ (refractive index) of 1.3328, identified by its infrared spectrum and neutralization equivalent.

EXAMPLE 11

A stainless steel autoclave of 1 gallon capacity is cooled to about −30° C. and is charged with 130 grams $CF_2\!=\!CH_2$ (2.04 moles), 2640 grams $C_3F_6$ (15.4 moles) and 182.2 grams $$CF_3CH_2O\overset{O}{\underset{\|}{C}}(CF_2)_3\overset{O}{\underset{\|}{C}}Cl$$

(0.536 moles). The autoclave is then warmed to about 0° C. and charged, with stirring, with a solution consisting of 240 milliliters $H_2O$, 23.0 grams NaOH and 72 milliliters of 30 percent $H_2O_2$. The reaction vessel is warmed to 26° C. and an exotherm to 30° C. occurs within about twenty minutes. A pressure of 185 p.s.i.g. is obtained at the start of the reaction and is observed to decrease to 165 p.s.i.g. after one hour of reaction. The reaction mixture is stirred for another hour at 30° C. and then the reactor is vented. The sticky mass of polymer is separated from the water phase and dissolved in 400 milliliters of xylene hexafluoride. The water phase is decanted and the polymer solution is stirred in 3000 milliliters of distilled water for one hour. The water phase is decanted and the solvent evaporated at about 70° C. under aspirator vacuum. A total of 333 grams of a very viscous syrup is obtained. Its inherent viscosity in xylene hexafluoride is 0.070 corresponding to a molecular weight of about 4300. Infrared analysis shows an absorption band at 5.55µ which is characteristic of the group:

$$-CF_2\overset{O}{\overset{\|}{C}}OCH_2CF_3$$

A portion of the above polymer, togther with three parts of water, is placed in a flask equipped with a stirrer and reflux condenser. The mixture is refluxed with stirring for twenty four hours. The water is then decanted from the flask and replaced with two parts of benzene. The flask is fitted with a Dean-Stark trap for removal of water from the water-benzene azeotrope, and the mixture is refluxed until no further water can be collected. The polymer product is a very viscous syrup having an inherent viscosity ($<\eta>$) in xylene hexafluoride of 0.068. Infrared analysis indicates an absorption at 5.63µ, corresponding to the structure $$-CF_2\overset{O}{\overset{\|}{C}}OH$$

and the absorption peak at 5.55µ cannot be detected. The product has a neutralization equivalent of 2050 and contains 55 mole percent of copolymerized $CF_2=CH_2$.

To 100 parts of the above hydrolyzed copolymer warmed to about 70° C. is mixed 1.7 parts of finely ground pentaerythritol. The mixture, suitable for use as a sealant material, is poured onto a polytetrafluoroethylene ("Teflon," a trademark of the Du Pont Co.) block and cured by heating 24 hours at 175° F., 24 hours at 240° F., and 24 hours at 300° F. The product is a clear, amber elastic solid.

EXAMPLE 12

A 1 gallon stainless steel autoclave is cooled to −30° C., and charged with 130 grams $CF_2=CH_2$, 2460 grams $C_3F_6$ and 461 grams of $$CF_3CH_2O\overset{O}{\overset{\|}{C}}CF_2CF_2CF_2\overset{O}{\overset{\|}{C}}Cl$$

After warming the reactor to about −5° C., a solution of 640 milliliters of water, 183 milliliters of 30 percent hydrogen peroxide and 58.2 grams NaOH is pressured in. The mixture is agitated and warmed to 30° C., at which point the reactor pressure is 175 p.s.i.g. The reaction is stirred for three hours at 30-36° C. and the pressure is observed to decrease to 158 p.s.i.g. The reactor is vented and the polymer discharged and the residual volatile components allowed to evaporate. The water phase is decanted and the polymer is stirred for 16 hours in one liter of acetonitrile. After decanting the acetonitrile, the polymer is dried in vacuum to give 330 grams of a viscous syrup having an inherent viscosity ($<\eta>$) of 0.048 in xylene hexafluoride, corresponding to a molecular weight of about 2700. Infrared analysis indicates the presence of $$CF_3CH_2O\overset{O}{\overset{\|}{C}}CF_2-$$

groups.

Similarly, 130 grams $CF_2=CH_2$, 2460 grams $C_3F_6$, 121.5 grams of $$CF_3CH_2O\overset{O}{\overset{\|}{C}}(CF_2)_3\overset{O}{\overset{\|}{C}}Cl$$

and a solution of 15.4 grams NaOH and 48 milliliters of 30 percent $H_2O_2$ in 240 milliliters of water are reacted to give 290 grams of a soft sticky solid. The product has an inherent viscosity ($<\eta>$) of 0.089 (equivalent to a molecular weight of about 9500). Infrared analysis confirms the presence of $$CF_3CH_2O\overset{O}{\overset{\|}{C}}CF_2-$$

groups, but the intensity of the absorption is diminished from that of the above run, indicating that this polymer is of higher molecular weight.

The molecular weight of the copolymers can be conveniently and systematically varied by varying the amount of initiator used. As shown in the two examples above, a ratio of 3.8:1 in the two initiator ingredient charges results in product molecular weights having a ratio of molecular weight of 1:3.5.

EXAMPLE 13

A one gallon stainless steel autoclave is cooled to −30° C. and charged with 213 grams $CF_2=CH_2$, 1000 grams $C_3F_6$ and 228 grams of $$CF_3CH_2O\overset{O}{\overset{\|}{C}}(CH_2)_3\overset{O}{\overset{\|}{C}}Cl$$

After warming to about −5° C., a solution of 450 milliliters water, 90 milliliters of $H_2O_2$ and 28.9 grams NaOH is added. The reactor is warmed and stirred at 24–30° C. for three hours. The reactor pressure is observed to drop from a maximum of 220 p.s.i.g. down to 120 p.s.i.g. during the reaction. The unreacted gases are vented from the vessel and the water phase is discarded. The product is stirred for 16 hours in 1000 milliliters of acetonitrile, then the acetonitrile is decanted and the polymer filtered. It is next washed with water and then placed in 1000 milliliters water and the water is refluxed for 16 hours. The product is separated from the water by decanting then azeotropically dried using benzene, and the benzene is then removed by heating under vacuum.

A very viscous syrup is obtained, 510 grams total which has an inherent viscosity ($<\eta>$) of 0.063 in xylene hexafluoride, $\overline{M}_n$ (number average molecular weight) is 3990 by vapor pressure osmometry. Analysis for percent carbon indicates that the product contains 65 mole percent copolymerized $CF_2=CH_2$. When 100 parts of this product is mixed with 1.8 parts of pentaerythritol and heated for 24 hours at 300° F., the resultant product is a tough rubber, insoluble in xylene hexafluoride.

EXAMPLE 14

A 60 milliliter pyrex-type glass ampoule is charged with a solution of 12.8 milliliters $H_2O$, 3.8 milliliters of 30 percent $H_2O_2$, and 1.16 grams of NaOH. The ampoule is cooled in liquid nitrogen and 9.2 grams of $$CF_3CH_2O\overset{O}{\overset{\|}{C}}(CF_2)_3\overset{O}{\overset{\|}{C}}Cl$$

1.3 grams $CF_2=CH_2$, and 24.6 grams $C_3F_6$ are added. The tube is shaken at room temperature for 8 hours, opened and the polymer is washed with water and dried in vacuum. The product is a clear syrupy liquid (3.1 grams) containing 56 mole percent $CF_2=CH_2$. Its inherent viscosity ($<\eta>$) at 1 percent concentration in xylene hexafluoride of 0.019 corresponds to a molecular weight of 1650. Infrared analysis shows a strong absorption at 5.55µ, characteristic of the $$CF_3CH_2O\overset{O}{\overset{\|}{C}}CF_2-$$

group.

EXAMPLE 15

An example of a cured polymer formulated with filler materials is as follows:

| | Parts |
|---|---|
| Copolymer of Example 13 above (65:35 mole ratio, molecular weight is about 4000, (—CF$_2$)$_3$COOH termination) | 100 |
| Zirconium silicate | 20 |
| Silicone oil-treated silica to control viscosity | 5 |
| Pentaerythritol | 1.5 |

The foregoing compounds are blended on a rubber mill and cured in open molds by the following heating cycle:

| Hours: | ° F. |
|---|---|
| 24 | 150 |
| 24 | 200 |
| 24 | 300 |

The resulting cured rubber is tough, exhibits good adhesion to metals, and is stable at elevated temperatures in the presence of hydrocarbon fuels. The formulation is thus suitable for sealing the fuel tanks of high speed aircraft.

EXAMPLE 16

In the following examples polymers of Formula 1 above are cured using a diepoxide curing agent:

In acetone are dissolved 100 parts of a $CF_2CH_2/C_3F_6$ copolymer (55/45 mole ratio) with $-(CF_2)_3COOH$ termination and a molecular weight of about 4000, and 10 parts of dicyclopentadiene diepoxide. The solvent is then removed under vacuum at room temperature. The so compounded stock is then heated at 300° F. for 16 hours producing a hard rubbery film which is insoluble.

EXAMPLE 17

In the following examples, polymers of Formula 1 above are cured using a trisamide curing agent:

In tetrahydrofuran are dissolved 100 parts of a $CF_2=CH_2/C_3F_6$ copolymer (55/45 mole ratio) with $-(CF_2)_3COOH$ termination and a molecular weight of about 4000, and 12.5 parts of

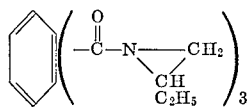

The solvent is then removed under vacuum at room temperature. The resulting compounded stock is pressed 1 minute at 200° F. and then heated in an oven for 24 hours at 100° F. The product is a clear rubbery film which is insoluble.

The claims are:

1. In a process for preparing copolymers of vinylidene fluoride and perfluoropropene, the improvement which comprises contacting a liquid mixture of vinylidene fluoride and perfluoropropene with a bis-(ω-carboxyl ester perfluoroacyl) peroxide.

2. A process for preparing copolymers of vinylidene fluoride and perfluoropropene comprising the step of contacting a liquid mixture of vinylidene fluoride and perfluoropropene with a bis-(ω-carboxyl ester perfluoroacyl) peroxide of the formula

where $R_f$ is a perfluoroalkylene group containing from 1 through 15 carbon atoms, and R is selected from the group consisting of hydrogen and an organic radical until the desired copolymers are formed.

3. A process for preparing copolymers of vinylidene fluoride and perfluoropropene comprising the step of admixing with a liquid mixture of vinylidene fluoride and perfluoropropene a bis-(ω-carboxyl ester perfluoroacyl) peroxide of the formula

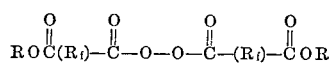

where $R_f$ is a perfluoroalkylene group containing from 1 through 15 carbon atoms, and R is selected from the group consisting of hydrogen and an organic radical, until the desired copolymerization results while maintaining
  (a) a mole ratio of vinylidene fluoride to said peroxide of from about 50:1 to 2:1, and
  (b) the entire mixture at a temperature in the range of from −5 to 100° C.

4. The process of claim 3 wherein the entire mixture is maintained under autogenous pressures.

5. A process for copolymerizing vinylidene fluoride and perfluoropropene comprising the step of admixing a liquid mixture of vinylidene fluoride and perfluoropropene containing dissolved therein a mono ester of a perfluoro dicarboxylic acid chloride of the formula

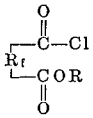

where $R_f$ is a perfluoroalkylene group containing from 1 through 15 carbon atoms, and R is selected from the group consisting of hydrogen; an α,α-dihydroalkyl radical containing not more than 20 carbon atoms and not more than 14 hydrogen atoms, the only other substituents in said alkyl radical being fluorine; an aryl radical containing from 6 through 12 carbon atoms and which may be substituted with fluorine, said mixture being further characterized by having a mole ratio of vinylidene fluoride to said acid chloride of from about 25:1 to 1:1 with an aqueous solution of a peroxide selected from the group consisting of alkali metal and alkaline earth metal peroxides, the amount of said peroxide being at least stoichiometrically equivalent to the amount of said acid chloride present, the ratio of the volume of said liquid mixture to the volume of said aqueous solution being in the range of from about 1:10 to 10:1 while maintaining intimate contact between the two respective phases and while maintaining the entire reaction mixture under autogenous pressures at temperatures in the range of from about −5 to 100° C. until the desired copolymerization reaction has proceeded to the desired extent.

6. The process of claim 5 wherein R of the acid chloride is methyl.

7. The process of claim 5 wherein R is 1,1-dihydrotrifluoroethyl.

8. The process of claim 5 wherein R is phenyl.

9. A process for copolymerizing vinylidene fluoride and perfluoropropene comprising the steps of:
  (a) contacting by vigorous agitation a liquid fluorocarbon containing dissolved therein a mono ester of a perfluoro dicarboxylic acid chloride of the formula

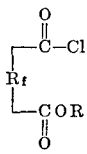

where $R_f$ is perfluoroalkylene group containing from 1 through 15 carbon atoms, and R is selected from the group consisting of hydrogen; an α,α-dihydroalkyl radical containing not more than 20 carbon atoms and not more than 14 hydrogen atoms, the only other substituents in said alkyl radical being fluorine; an aryl radical containing from 6 through 12 carbon atoms; and which may be substituted with fluorine, with an aqueous solution of a peroxide selected from the group consisting of alkali metal and alkaline earth metal peroxides, at a temperature below 10° C. for a period of time sufficient to generate a diacyl peroxide in said liquid fluorocarbon but insufficient to cause appreciable decomposition of said diacyl peroxide, the mole ratio of said diacyl peroxide to said mono ester acid chloride being at least stoichiometric,
  (b) separating the resulting liquid fluorocarbon from the residual aqueous solution, and
  (c) admixing said resulting fluorocarbon phase with a liquid mixture of vinylidene fluoride and perfluoropropene in a total amount such that in said liquid mixture the mole ratio of said vinylidene fluoride to said diacyl peroxide ranges from about 50:1 to 2:1, the mole ratio of said perfluoropropene to said vinylidene fluoride in said liquid mixture being at least 2:1.

10. The process of claim 9 wherein R of the mono ester acid chloride is methyl.

11. The process of claim 9 wherein R is 1,1-dihydrotrifluoroethyl.

12. The process of claim 9 wherein the product polymer is hydrolyzed.

13. The process of claim 9 wherein R is phenyl.

14. Copolymers of the formula

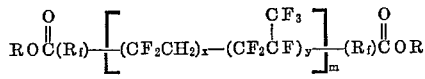

wherein R is selected from the group consisting of hydrogen and an organic radical, $R_f$ is a perfluoroalkylene group containing from 1 through 15 carbon atoms, $m$ is a positive whole number of at least 5 and preferably less than 500 and more preferably less than 100, and $x$ and $y$ are positive numbers, $y$ being 1, and the average ratio of $x$ to $y$ in a copolymer molecule is from about 1:1 to 10:1.

15. Copolymers of the formula

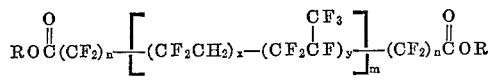

wherein R is selected from the group consisting of hydrogen and an organic radical, $n$ is a positive whole number of from 2 through 10, $m$ is a positive whole number of at least 5 and perferably less than 500 and more preferably less than 100, $x$ and $y$ are positive numbers, $y$ being 1, and the average ratio of $x$ to $y$ in a copolymer molecule is from about 1:1 to 1.9:1.

16. Compounds of claim 15 wherein R is hydrogen.

17. A cured material obtained by heating the copolymer of claim 16 with a polyhydric compound.

18. The product of claim 17 wherein the polyhydric compound is pentaerythritol.

19. A sealant composition comprising a cured material of claim 17 and a filler, there being from 5 to 100 parts of filler for each 100 parts of cured material.

20. The process of curing a compound of claim 15 comprising heating a mixture of such compound with a polyhydric alcohol at a temperature of from 200 to 350° FX. until the desired curing results.

21. Ester terminated copolymers of the formula

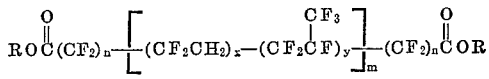

wherein R is an organic radical, $n$ is a positive whole number of from 2 through 10, $m$ is a positive whole number of at least 5, $x$ and $y$ are positive numbers, $y$ being 1, and the average ratio of $x$ to $y$ in a copolymer molecule is from about 1:1 to 1.9:1.

22. Copolymers of claim 21 wherein R is an α,α-dihydroalkyl radical containing not more than 20 carbon atoms and not more than 14 hydrogen atoms, the only other substituents in said alkyl radical being fluorine.

23. Compounds of claim 22 wherein R is methyl.

24. Compounds of claim 22 wherein R is 1,1-dihydrotrifluoroethyl.

25. Compounds of claim 21 wherein R is an aryl radical containing from 6 through 12 carbon atoms and which may be substituted with fluorine.

26. Compounds of claim 25 wherein R is phenyl.

References Cited

UNITED STATES PATENTS 3,147,314   9/1964   Cluff _____ 260—87.7

JOSEPH L. SCHOFER, *Primary Examiner.*

JOHN A. DONAHUE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,438,953            April 15, 1969

David E. Rice et al.

It is certified that error appears in the above identified patent and that said Letters Patent are hereby corrected as shown below:

Column 2, line 66, that portion of equation (3) reading "$2xCF_2=CH_2$" should read -- $xCF_2=CH_2$ --. Column 10, line 13, that portion of the formula reading "$(CH_2)_3$" should read -- $(CF_2)_3$ --. Column 14, line 4, that portion of claim 20 reading "FX." should read -- F. --.

Signed and sealed this 29th day of July 1969.

(SEAL)
Attest:

Edward M. Fletcher, Jr.          WILLIAM E. SCHUYLER, JR.
Attesting Officer                   Commissioner of Patents